June 7, 1938. H. WOLTHUIS ET AL 2,119,978
AIR FILTER
Filed July 10, 1933 5 Sheets-Sheet 1
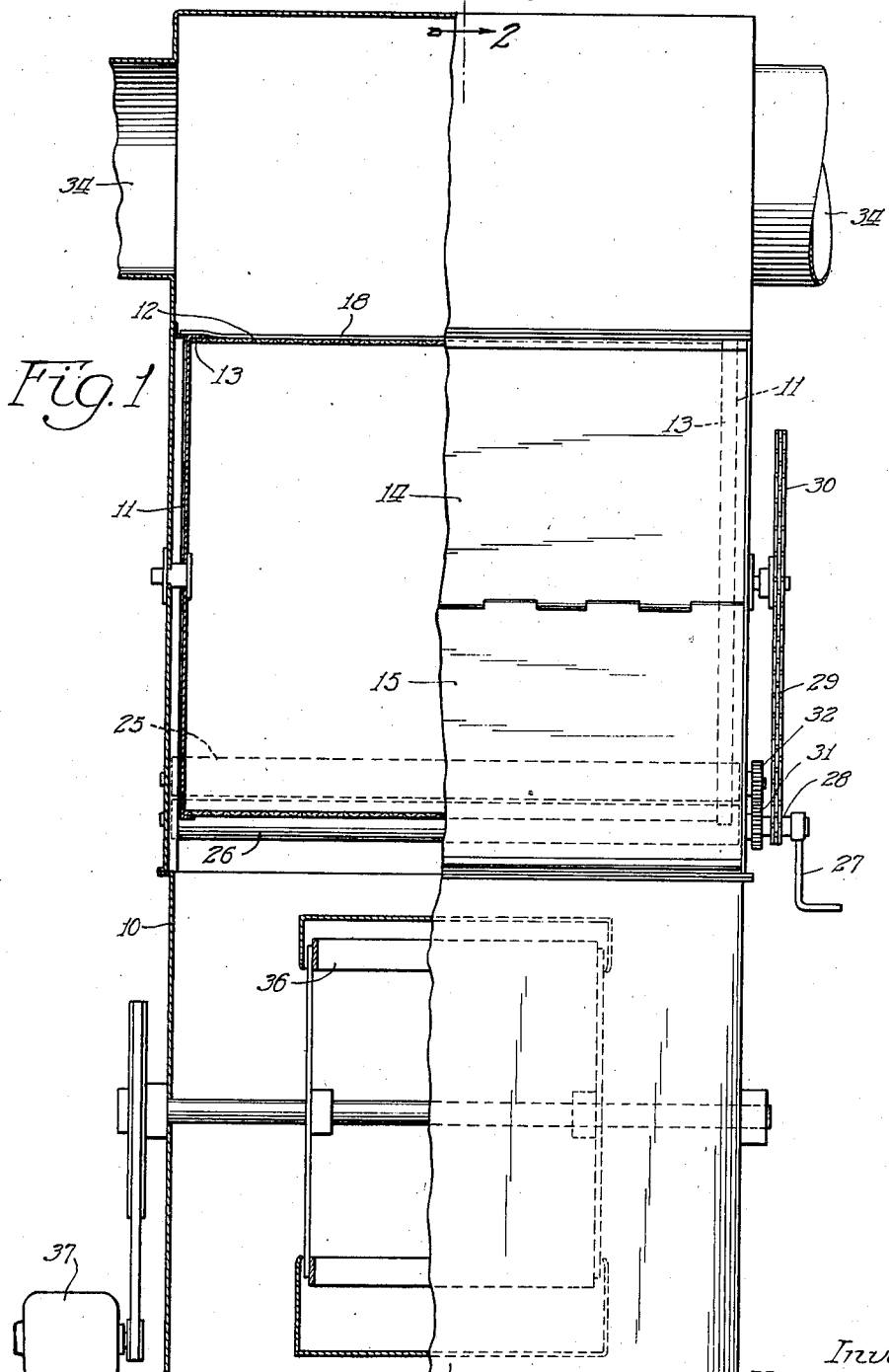
Inventors
Herman Wolthuis
Charles A. Fourness
By: Fisher, Clapp, Soans & Pond
Attys

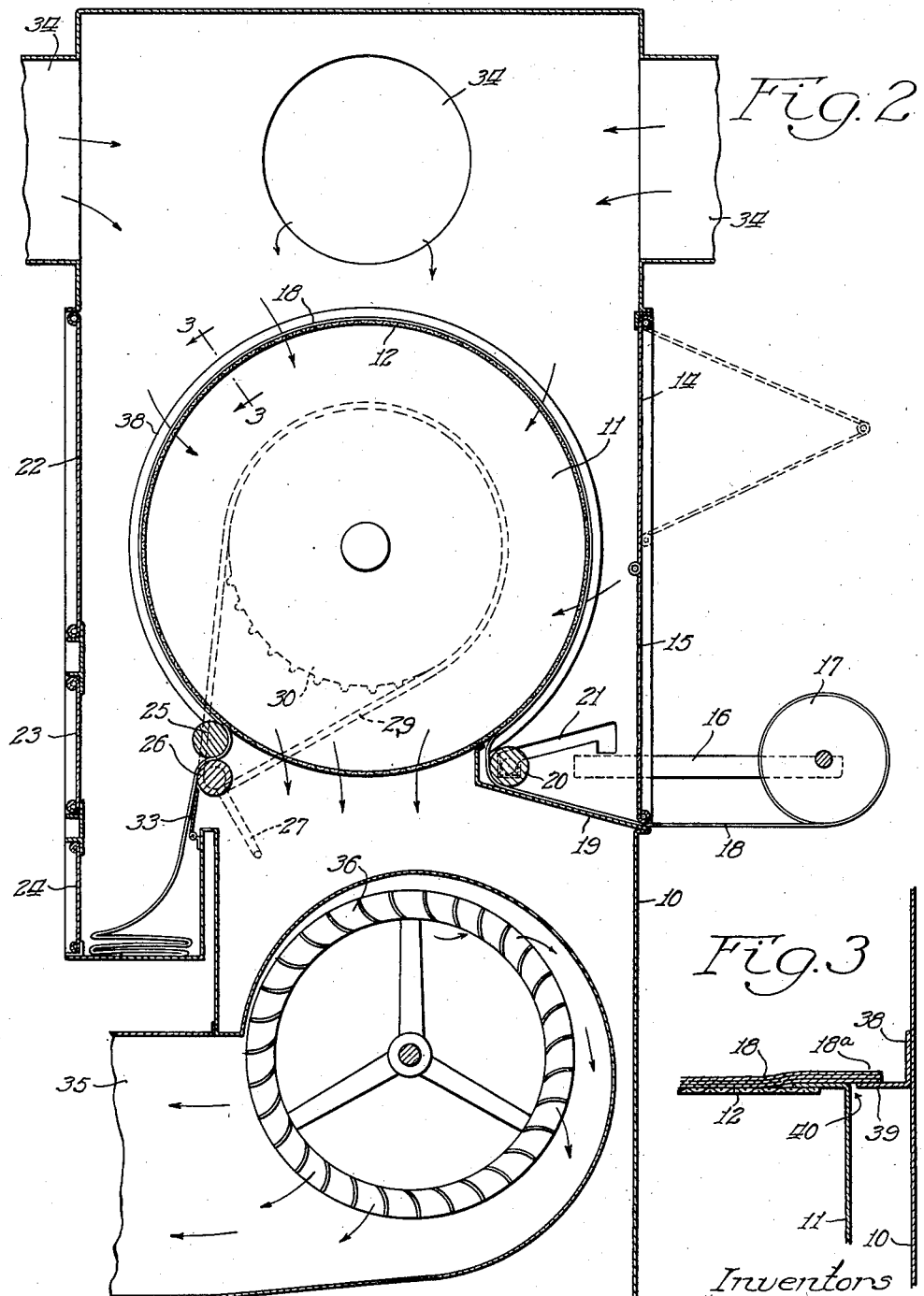

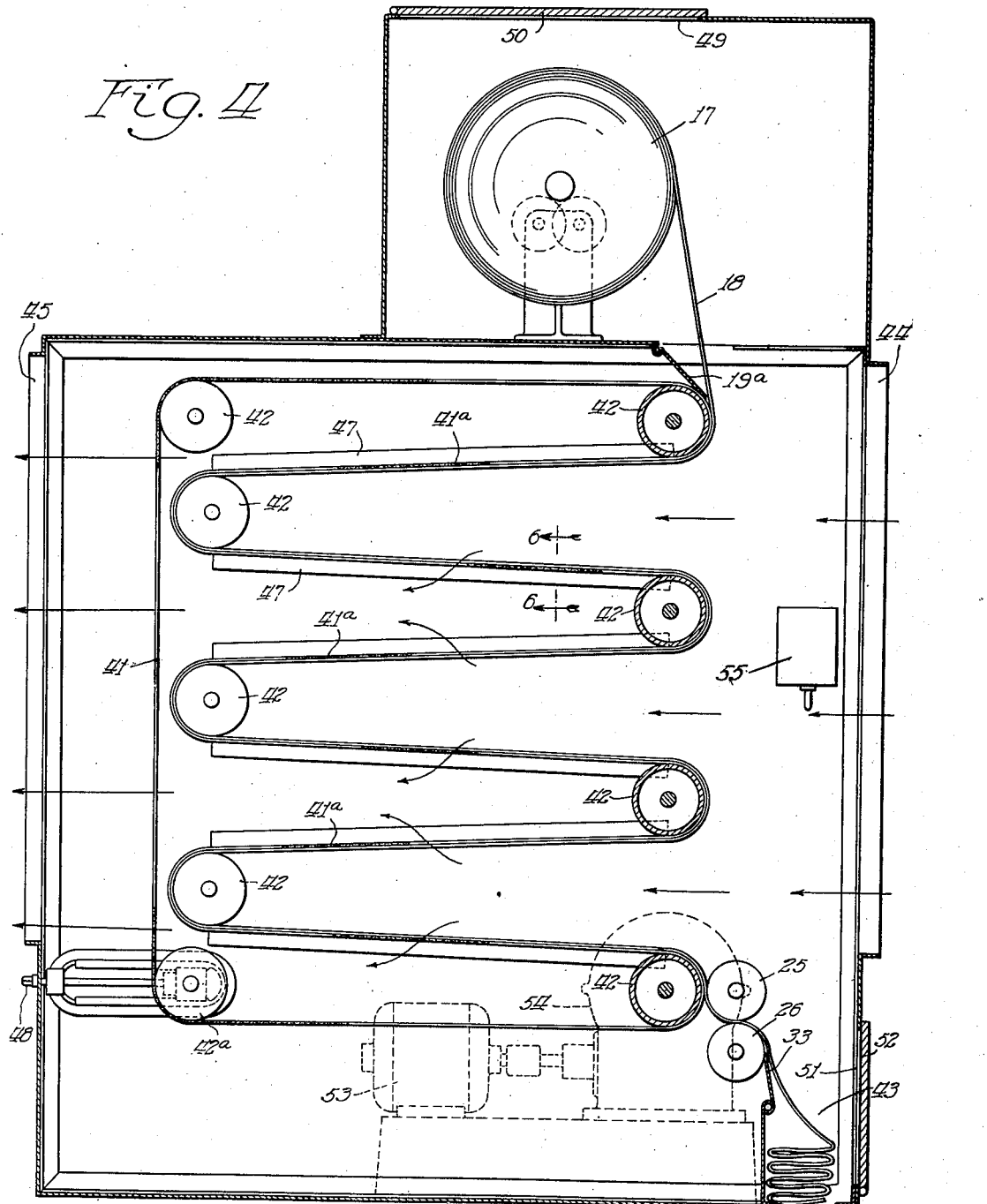

June 7, 1938.　　　H. WOLTHUIS ET AL　　　2,119,978
AIR FILTER
Filed July 10, 1933　　　5 Sheets-Sheet 4
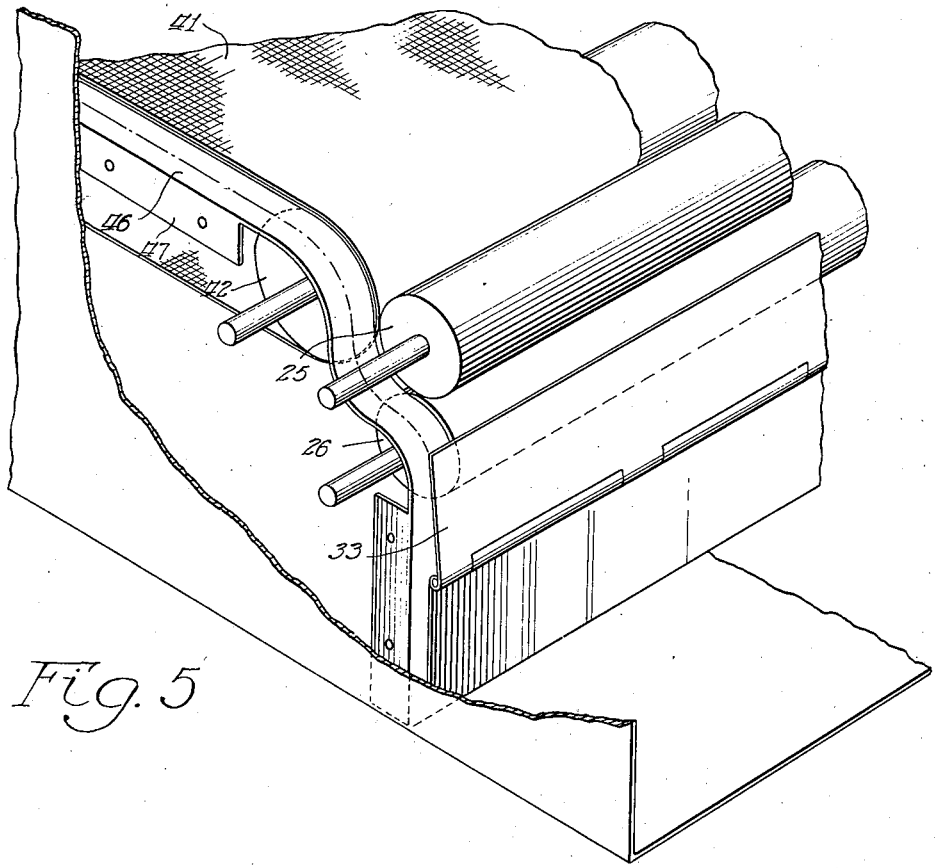
Fig. 5
Fig. 6
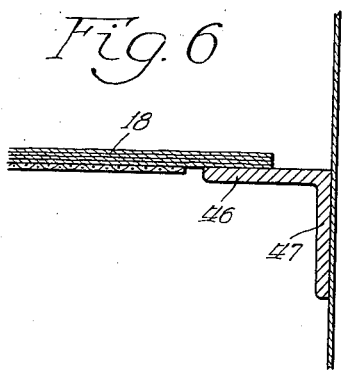
Inventors
Herman Wolthuis
Charles A. Fourness
By Fisher, Clapp, Soans & Pond
Attys June 7, 1938.   H. WOLTHUIS ET AL   2,119,978
AIR FILTER
Filed July 10, 1933    5 Sheets-Sheet 5

Inventors
Herman Wolthuis
Charles A. Fourness
By: Fisher, Clapp, Soans & Paul
Attys.

Patented June 7, 1938

2,119,978

UNITED STATES PATENT OFFICE 2,119,978

AIR FILTER

Herman Wolthuis, Neenah, and Charles A. Fourness, Appleton, Wis., assignors to Paper Patents Company, Neenah, Wis., a corporation of Wisconsin Application July 10, 1933, Serial No. 679,650

10 Claims. (Cl. 183—62)

This invention relates to improvements in apparatus for cleaning air by filtering dust and other foreign matter from the air.

The main purposes of the invention are to provide air filtering means of the type referred to which is relatively simple in construction, efficient in operation and economical to maintain and operate.

Other objects and advantages of the invention will be understood by reference to the following specification and accompanying drawings (5 sheets) wherein are illustrated three forms of air filters embodying the features of the present invention.

In the drawings:

Fig. 1 is an elevation, partly in section, showing an air filter embodying the type of construction which is particularly adapted for domestic use;

Fig. 2 is a section on the line 2—2 of Fig. 1;

Fig. 3 is a section on the line 3—3 of Fig. 2;

Fig. 4 is a section similar to Fig. 2 but of a modified form of air filter having a larger filtering capacity than the form shown in Fig. 2;

Fig. 5 is a perspective illustrating the arrangement of certain parts of the mechanism shown in Fig. 4;

Fig. 6 is a section on the line 6—6 of Fig. 4; and

Figure 7:
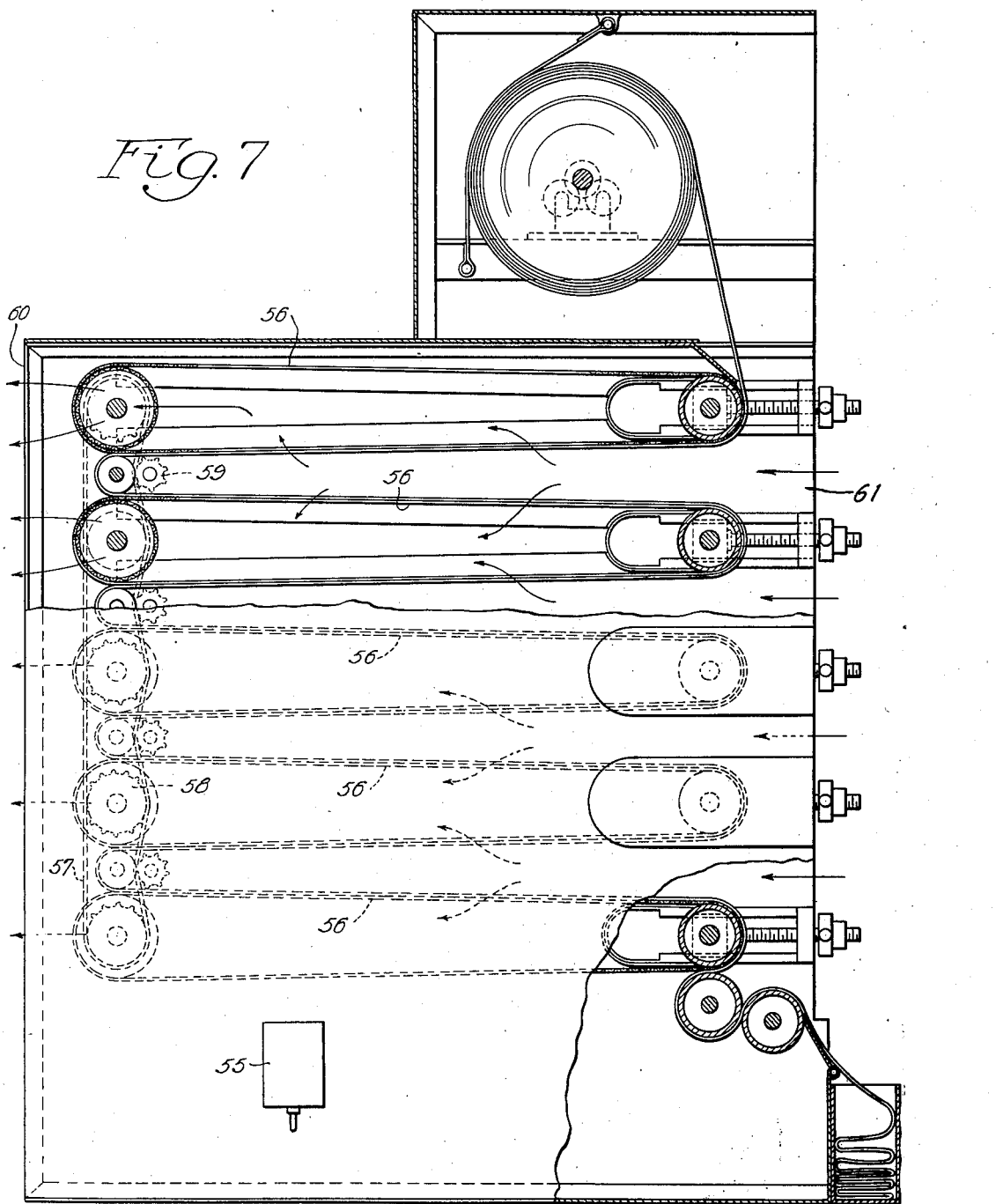
Fig. 7 is a section similar to Fig. 4 and showing a still further modified arrangement.

Referring now more particularly to Figs. 1, 2 and 3, the air filter therein disclosed comprises a casing 10 which may be of suitable sheet metal constuction supported on angle iron or other framing, as is general in construction of devices of the type herein referred to. Within the casing, there is rotatably mounted a drum 11 which has suitable end members provided with means for rotatably supporting the drum, as clearly shown in Fig. 1. The peripheral surface of the drum is formed of foraminous material, such as wire screening indicated at 12, such screening being secured at its side edges to inwardly extending flange portions 13 of the drum ends. One side of the casing opposite the drum is provided with hinged doors 14 and 15 which are adapted to be moved upwardly to the position indicated in broken lines in Fig. 2, to afford access to the foraminous drum. Adjacent the lower end of the opening in which the doors 14 and 15 are located, there is provided a support 16 for a supply roll 17 of filtering material in the form of a sheet or web 18. The filtering material web is delivered to the drum 11 by being directed into the casing between the lower edge of the door 15 and the surface of the apron 19 which guides the webbing upwardly under a guide roll 20 about which the webbing is directed upwardly into engagement with the drum surface. The apron 19 is suitably supported at its opposite sides by connection with the casing side walls or in any other suitable manner, and the guide roll 20 is preferably mounted so as to be rotatable and also so as to be adjustable toward and from the drum 11. In this instance, the roll 20 is so mounted by means of an inclined slot or recess arrangement 21 into which end shafts of the roll 20 project. By reference to Fig. 2, it will be understood that the roll 20 may be adjusted from its operative position as illustrated, to inoperative position in the upper end of the slot 21 to facilitate the insertion and proper disposition of the filter web on the drum.

The side of the casing opposite the doors 14 and 15 is also provided with suitably hinged or removably mounted doors 22, 23 and 24 which, when opened, afford access to the drum and other parts within the casing.

Approximately opposite the point of delivery of the webbing to the drum, i. e., the webbing receiving point, the following arrangement is provided for removing the webbing from the drum: A pair of rolls 25 and 26 respectively are mounted adjacent the drum so that the webbing may be threaded between them, the roll 25 being preferably mounted in such proximity to the drum surface as to normally maintain the webbing in engagement with the drum surface. The rolls 25 and 26 and the drum 11 are adapted to be rotated, in this instance manually, through the agency of a crank 27 which is secured to a shaft element integral with or secured to the roll 26. Such shaft element is provided with a sprocket 28 which receives a chain 29, which chain in turn extends around a sprocket 30 carried by a shaft element projecting from one end of the drum 11. The rolls 25 and 26 are also geared together by means of gears 31 and 32 carried by the end shafts of the said rolls. The ratio of the sprockets 28 and 30 and the ratio of the gears 31 and 32 are preferably so arranged that the rolls 25 and 26 will be driven at a surface speed slightly in excess of the surface speed of the drum 11. This arrangement causes the rolls 25 and 26 to pull the webbing taut on the drum, which is the desired condition of the webbing for filtering purposes. An apron 33 hingedly connected at one edge to a convenient portion of the casing is arranged with its free edge in engagement with the roll 26 to close the space between the roll 26 and the adjacent casing portion.

One or more inlet openings designated 34 are provided adjacent the upper end of the casing and an outlet opening designated 35 is provided adjacent the lower end of the casing. A typical installation of the described device would be in connection with a house-heating furnace, wherein the air drawn from the heated rooms circulates downwardly through the inlet openings 34, through the filtering material web on the drum and out through the outlet 35 to the cold air receiving duct of a furnace. Of course, the connection between the described filtering mechanism and the furnace is not necessary and is referred to only in connection with a typical arrangement. To insure a sufficient flow of air through the filtering medium, an air fan 36, preferably of a turbine type, is located in the lower portion of the casing so as to tend to reduce the air pressure in such lower casing portion, thereby to facilitate the flow of air through the filtering drum. The fan 36 may be mounted for rotation in any suitable manner, for example, as indicated in Fig. 1, and it may be driven by means of a pulley and belt connection with an electric motor 37.

It will be evident that in a filtering device of the character described, it is important to prevent leakage of air around the filtering medium. In the present instance, such leakage is prevented between the drum surface and the casing by means of the apron 19 at the filter material receiving portion of the drum and by means of the apron 33 and rolls 25 and 26 at the filter discharge portion of the drum.

For practical purposes, it is desirable to provide free working space between the ends of the drum 11 and the adjacent casing, substantially as indicated in Figs. 1 and 3 and to prevent air leakage between the drum ends and the casing, the following arrangement is provided: An angle iron element 38 is secured to the casing wall with one of its flanges 39 disposed substantially in alignment with the drum surface. The filtering material webbing 18 is of greater width than the width of the drum so that a marginal portion 18ª of the filtering material web overlaps the flange 39 so as to close the comparatively small space indicated at 40 between the drum end and the adjacent edge of the angle iron flange 39. This arrangement is provided at both ends of the drum and it extends around that portion of the drum (clearly shown in Fig. 2) which supports the webbing in operative filtering position.

The filtering capacity of the mechanism depends, of course, upon the thickness of the filtering medium and the exposed area thereof. For a small capacity air filter unit, the drum 11 may be approximately 2½ feet in diameter and approximately 3 feet in length. These proportions may, of course, be varied to suit the requirements of the particular installation.

Where a very large capacity air filter embodying the above described construction is desired, the arrangement may be such as shown in Figs. 4 or 7.

In the arrangement shown in Fig. 4, instead of providing a drum having a foraminous surface, a foraminous belt 41 of screening or the like is movably supported by means of a plurality of rolls 42. As clearly shown, the rolls are so arranged as to guide the major portion of the belt through a zigzag path of travel within the casing, thereby to provide a very large area of filter supporting screen surface.

The supply roll 17 of filtering material webbing is, in this instance, supported on the top of the casing and the webbing is delivered to the screen at the upper or starting end of its zigzag path of travel. By reference to Fig. 4 it will be seen that the webbing material 18 is carried through a zigzag path of travel by the foraminous belt and at the lower or discharge end of the said zigzag path of travel of the belt is discharged to a suitable receptacle 43 for receiving the used or waste webbing. A pair of rolls 25 and 26 and an apron 33, corresponding to the same parts in the previously described structure, serve to remove the webbing from the belt and to prevent air leakage between the belt and the casing. An apron 19ª at the receiving end of the belt corresponds to the apron 19 of the form shown in Fig. 2 and serves the same purpose.

In this construction, the air inlet opening is designated 44 and is located in one side of the casing, while the discharge opening is located in the opposite side and is designated 45. A suitable blower arrangement may be connected with either the inlet or outlet end of the casing for forcing air to pass through the filter material and it will be understood that the relative air pressure thus developed on the inlet side of the casing, as compared with the opposite side, will serve to maintain the webbing in engagement with the reaches of the belt designated 41ª which face downwardly. The side edges of the foraminous belt are arranged with reference to a flange 46 of an angle iron member 47 secured to the adjacent casing wall to cause marginal portions of the webbing 18 to lap over such flange to thereby prevent air leakage around the sides of the web, substantially as previously described. The flange 46 is preferably continuous through the path of travel of the webbing, vertical flange portions of the angle iron 47 being cut away to permit bending of the flange 46 into alignment with the portions of the belt extending around the respective rolls 42.

One of the rolls, preferably the roll indicated at 42ª, is adjustably mounted and suitable means such as indicated at 48 is provided for facilitating adjustment of the roll 42ª to control the tautness of the foraminous belt 41.

A suitable roll of webbing 17 may be delivered to its position as illustrated in Fig. 4 through an opening 49 provided at the top of the casing, which is normally closed by a suitable cover 50. Access to the waste receiving compartment 43 may be had through a suitable opening 51 in the casing, which opening is normally closed by a suitable cover 52.

In large capacity filters such as just described, it may be desired to cause the foraminous belt and filter sheet 18 to move continuously in accordance with a predetermined rate of travel so as to maintain a substantially constant filtering capacity. It will, of course, be understood that in the event that the filtering material remains stationary, the filtering capacity gradually becomes lowered by reason of the accumulation of dust and other foreign matter in the filtering material sheet, which tends to slow up and ultimately stop the passage of air through the filtering medium. Accordingly, by effecting continuous movement of the web at the proper rate of speed, a substantially constant filtering capacity may be obtained.

In the present instance, such movement of the foraminous belt and filtering medium may be effected by means of an electric motor 53 which propels the foraminous belt through the agency of a suitable speed reducing driving arrangement designated 54. The speed reducer 54 is of course connected to the shaft of one or the rolls 42, in this instance the roll 42 at the discharge end of the foraminous belt. The rolls 25 and 26 may also be driven by suitable connections to the same shaft and they may be driven at a slightly faster surface speed than the belt so as to obtain the pulling effect on the webbing, although this is not so important in the described type of structure, inasmuch as the webbing and belt are held in close driving contact with each other as an incident to the passage of the webbing between the belt and certain of the rolls 42.

In some instances, the movement of the webbing and screen 41 need not be constant but will be preferably automatically controlled by the change in the filtering capacity of the webbing then in operative position within the filter. In such instances, the changes in filtering capacity may be detected by the increase in air pressure on the inlet side of the casing, in the event that a blower is connected to the inlet side. Accordingly, the motor 53 may be controlled by a pressure actuated switch 55 located in the casing on the inlet side of the filtering web. When the web becomes so filled up with foreign matter that its filtering capacity is reduced to a predetermined point, the air pressure will of course be increased on the inlet side of the casing and the switch 55 may be arranged to then close a circuit for operating the motor 53 to thereby effect movement of the belt 41 and the positioning of a clean supply of filtering web in operative position in the casing. When sufficient new or clean filtering web is in position to permit the air pressure to drop to normal, the switch 55 will again be actuated to break the circuit to the motor 53 to thereby stop the movement of the belt.

In the form shown in Fig. 7, the arrangement of web supplying and web discharging mechanism is substantially the same as that shown in Fig. 4, but instead of providing a single foraminous belt 41 and threading the same around rolls to cause the belt to travel through a zigzag path of travel, a plurality of relatively independent foraminous belts 56 are provided. The belts 56 are arranged in approximately parallel spaced relation and they are connected for simultaneous movement.

In the present instance, simultaneous movement of all of the belts is effected by means of a chain 57 which engages sprockets such as 58 carried by one guide roll for each of the belts 56, and idler sprockets 59 which serve to maintain the belt effectively in engagement with the sprockets 58. Driving means for the belts may be in the form of a motor and speed reducer such as shown and described in connection with Fig. 4, which mechanism may be connected to any one of the belt supporting rolls, although preferably to one of the rolls which carries one of the sprockets 58. When the drive is effected through one of the rolls having one of the sprockets 58, no one screen is subjected to the strain of transmitting power to drive all of the other screens, and by providing a plurality of belts instead of one long belt, there is less strain on each belt than on one long belt by reason of the fact that there is much less resistance due to the moving of a short belt than there is to moving one long belt extending around a large number of guide rolls.

In Fig. 7, a pressure operated switch 55 is shown located on the outlet side of the casing where it would be located when a blower or other air propelling means is located or connected with the outlet side of the air filter.

In Fig. 7, it will be understood that the inlet side of the filter is the side designated 61, while the outlet side is the side designated 60. Any suitable form of opening may be provided for the inlet and outlet sides and in some instances, the filtering device may be located in a filtering room one side of which receives air to be filtered from various other rooms, and the other side of which is connected to conduits for carrying the filtered air to the desired rooms or apparatus.

Changes may be made in the described construction without departing from the spirit of the invention, the scope of which should be determined by reference to the following claims and the same should be construed as broadly as possible consistent with the state of the art.

We claim:

1. In a filter of the class described, the combination of a casing having inlet and outlet openings, a foraminous element mounted in said casing with the side edges of the foraminous element in spaced relation to the casing and so as to be movable therein for receiving and carrying a filtering material sheet through said casing and discharging the sheet after use thereof, and stationary means carried by said casing in the spaces between the side edges of said foraminous element and casing and extending approximately coplanar with said foraminous element towards the edge thereof for underlying marginal portions of a sheet of filter material carried by said foraminous element thereby to prevent leakage between the edges of said foraminous element and said casing, the pressure of air from said inlet acting to force the edges of the filtering sheet against said stationary means.

2. In a filter of the class described, the combination of a casing having inlet and outlet openings, a foraminous element mounted in said casing with the side edges of the foraminous element in spaced relation to the casing and so as to be movable therein for receiving and carrying a filtering material sheet through said casing and discharging the sheet after use thereof, stationary means carried by said casing and aligned with the sides of said element for receiving and supporting marginal portions of a sheet of filter material carried by the element, means for closing the space between said foraminous element and the casing adjacent the filter sheet receiving portion of the element, means for closing the space between said element and the casing adjacent the filter sheet discharging portion of the element, and means for effecting movement of the foraminous element with said filter sheet thereon.

3. In a filter of the class described, the combination of a casing having inlet and outlet openings, a foraminous drum mounted in said casing with the side edges of the drum in spaced relation to the casing and so as to be rotatable therein for receiving and carrying a filtering material sheet through said casing and discharging the sheet after use thereof, stationary means carried by said casing and aligned with the sides of said drum for receiving and supporting marginal portions of a sheet of filter material carried by the drum, means for closing the space between said drum and the casing adjacent the filter sheet receiving portion of the drum, means for closing the space between said drum and the casing adjacent the filter sheet discharging portion of the drum, and means for effecting movement of said drum with said filter sheet thereon.

4. In a filter of the class described, the combination of a casing having inlet and outlet openings, a foraminous belt, means in said casing for supporting and guiding said belt through a zigzag path of travel within the casing, said foraminous belt being spaced at its side edges from the adjacent sides of the casing and being adapted to receive and carry a sheet of filter material, means carried by the sides of the casing and aligned with the path of travel of the belt for receiving marginal portions of said sheet of filter material to prevent leakage of air between the sides of the belt and the adjacent sides of the casing, and means for propelling the belt and said filter sheet carried thereby.

5. In a filter of the class described, the combination of a casing having inlet and outlet openings, a foraminous belt, means in said casing for supporting and guiding said belt through a zigzag path of travel within the casing, said foraminous belt being spaced at its side edges from the adjacent sides of the casing and being adapted to receive and carry a sheet of filter material, means carried by the sides of the casing and aligned with the path of travel of the belt for receiving marginal portions of said sheet of filter material to prevent leakage of air between the sides of the belt and the adjacent sides of the casing, means for supporting a supply of filter material webbing for delivery to said foraminous belt, means extending between the casing and the web receiving portion of the belt for preventing leakage of air between the casing and said web receiving portion of the belt, means adjacent the web discharging portion of the belt for receiving and pulling the web from the belt, and means for propelling said belt and actuating said web pulling means.

6. In a filter of the class described, the combination of a casing having inlet and outlet openings, a plurality of relatively independent foraminous belts mounted in said casing in approximately parallel relation, means for supporting a supply of filter material webbing for delivery to one of said foraminous belts, means between adjacent belts for transmitting the filtering material web from one belt to the other, and means for propelling said belts in unison.

7. In a filter of the class described, the combination of a casing having inlet and outlet openings, a foraminous element within said casing and mounted therein for movement within the casing, means adjacent a portion of said foraminous element for delivering a filtering material web to the foraminous element, and means adjacent another portion of said element for removing such filter material web from the foraminous element comprising a pair of rolls mounted for rotation and in such relation as to be adapted to grip the filter web between them, means for propelling said foraminous element, and means for propelling said rolls at a surface speed in excess of the speed of said foraminous element to thereby tend to maintain the webbing taut upon the foraminous element.

8. In a filter of the class described, the combination of a casing having inlet and outlet openings, a foraminous element within said casing and mounted therein for movement within the casing, means adjacent a portion of said foraminous element for delivering a filtering material web to the foraminous element, and means adjacent another portion of said element for removing such filter material web from the foraminous element comprising a pair of rolls mounted for rotation and in such relation to the foraminous element as to grip the filtering material web between one of the rolls and the foraminous element and so as to grip the filter web between them, and means for propelling said foraminous element.

9. In a filter of the class described, the combination of a casing having inlet and outlet openings, a foraminous element within said casing and mounted therein for movement within the casing, means adjacent a portion of said foraminous element for delivering a filtering material web to the foraminous element, means adjacent another portion of said element for removing such filtering material web from the element comprising a pair of rolls mounted for rotation and in such relation as to be adapted to grip the filter web between them, means for propelling said foraminous element, means for propelling said rolls at a surface speed in excess of the speed of said foraminous element to thereby tend to maintain the webbing taut upon the foraminous element, and an apron extending between the casing and one of said rolls for preventing air leakage between the casing and such roll.

10. In a filter of the class described, the combination of a casing having inlet and outlet openings, a plurality of relatively independent, spaced and foraminous belts mounted in said casing in such relation that when the belts are simultaneously propelled in the same direction, contiguous reaches of the belts are adapted to cooperate to receive and carry a web of filtering material through a predetermined path of travel through said casing, means between the respective belts for transmitting the filtering material web from one belt to the other, and means for propelling said belts in unison.

CHARLES A. FOURNESS.
HERMAN WOLTHUIS.